US012663898B2

(12) United States Patent
Ahn

(10) Patent No.: US 12,663,898 B2
(45) Date of Patent: Jun. 23, 2026

(54) TOUCH MICROCONTROLLER UNIT AND TOUCH SENSING CIRCUIT FOR CALCULATING TOUCH COORDINATES

(71) Applicant: LX SEMICON CO., LTD., Daejeon (KR)

(72) Inventor: Su Hyun Ahn, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/521,364

(22) Filed: Nov. 28, 2023

(65) Prior Publication Data

US 2025/0173024 A1      May 29, 2025

(30) Foreign Application Priority Data

Sep. 29, 2022    (KR) ........................ 10-2022-0124375

(51) Int. Cl.
G06F 3/041      (2006.01)
G06F 3/044      (2006.01)
(52) U.S. Cl.
CPC ........ G06F 3/04186 (2019.05); G06F 3/0446 (2019.05)

(58) Field of Classification Search
CPC ........................... G06F 3/04186; G06F 3/0446
See application file for complete search history.

(56) References Cited

U.S. PATENT DOCUMENTS

| | | | | |
|---|---|---|---|---|
| 8,976,121 B2 * | 3/2015 | Hung | .................... | G06F 3/0446 345/173 |
| 2011/0096024 A1 * | 4/2011 | Kwak | ................... | G06F 3/0445 345/174 |
| 2017/0046007 A1 * | 2/2017 | Kitagawa | .............. | G06F 3/0446 |
| 2019/0079576 A1 * | 3/2019 | Liu | ..................... | G06F 3/04166 |
| 2024/0160319 A1 * | 5/2024 | Lee | ....................... | G06F 3/0446 |

* cited by examiner

*Primary Examiner* — David D Davis
(74) *Attorney, Agent, or Firm* — ROTHWELL, FIGG, ERNST & MANBECK, P.C.

(57) ABSTRACT

A touch microcontroller unit including a touch data acquisition circuit to acquire touch data of a first area and a second area of a first panel. The touch microcontroller unit including an area division boundary calculation circuit to calculate a boundary in the first panel to divide the first area and the second area. The touch microcontroller unit including a touch coordinate calculation circuit to calculate touch coordinates of the first area based on the touch data of the first area. The touch microcontroller unit including a touch data transmission circuit to transmit the touch coordinates of the first area and the touch data of the second area to another touch microcontroller unit.

18 Claims, 15 Drawing Sheets

<u>145</u>

Touch Data Acquisition Circuit — 210

Area Division Boundary Calculation Circuit — 220

Touch Coordinate Calculation Circuit — 230

Touch Data Transmission Circuit — 240

300

| 0 | 0 | 0 | 0 | 0 | 0 | 0 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 1 | 2 | 0 | 2 | 0 | 0 | 0 | 0 | 0 | 0 |
| 0 | 0 | 0 | 131 | 234 | 20 | 0 | 0 | 0 | 0 | 0 | 0 |
| 0 | 0 | 1 | 201 | 238 | 28 | 0 | 0 | 0 | 0 | 0 | 0 |
| 0 | 0 | -1 | 12 | 12 | 13 | 0 | 0 | 0 | 0 | 0 | 0 |
| 0 | 0 | 0 | 0 | 0 | 0 | 5 | 8 | 7 | 1 | 0 | 0 |
| 0 | 0 | 0 | 0 | 0 | 0 | 15 | 224 | 183 | 1 | 0 | 0 |
| 0 | 0 | 0 | 0 | 0 | 0 | 18 | 210 | 180 | 2 | 0 | 0 |
| 0 | 0 | 0 | 0 | 0 | 0 | 1 | 1 | 2 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

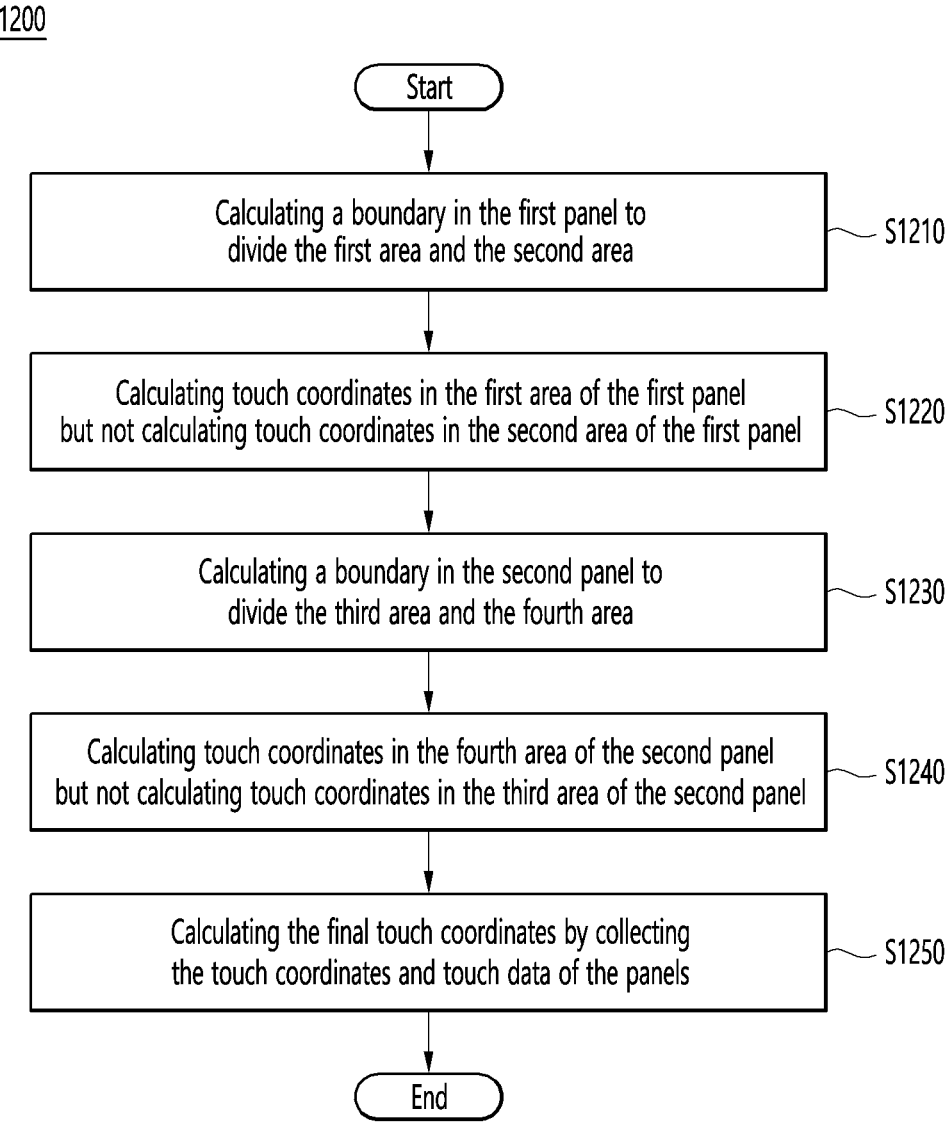

Start

Calculating a boundary in the first panel to
divide the first area and the second area — S1210

Calculating touch coordinates in the first area of the first panel
but not calculating touch coordinates in the second area of the first panel — S1220

Calculating a boundary in the second panel to
divide the third area and the fourth area — S1230

Calculating touch coordinates in the fourth area of the second panel
but not calculating touch coordinates in the third area of the second panel — S1240

Calculating the final touch coordinates by collecting
the touch coordinates and touch data of the panels — S1250

End

TOUCH MICROCONTROLLER UNIT AND TOUCH SENSING CIRCUIT FOR CALCULATING TOUCH COORDINATES

CROSS-REFERENCE TO RELATED APPLICATIONS

The present application claims the benefits of priority to Korean Patent Application No. 10-2022-0124375, filed on Sep. 29, 2022 in the Republic of Korea, the entire contents of which are hereby expressly incorporated by reference into the present application

BACKGROUND OF THE DISCLOSURE

Field

The embodiment relates to a touch microcontroller unit and a touch sensing circuit that senses a touch by a touch electrode disposed on a touch panel.

Discussion of the Related Art

Recently, the use of touch functions in display panels ranging from small electronic devices (e.g., smartphones) to large electronic devices (e.g., TVs or electronic whiteboards) is increasing.

A touch panel refers to a transparent switch panel that has the function of operating a device or executing a program when the user presses text, images, or icons. In a touch panel, touch electrodes TE of a certain size can be arranged according to a specific arrangement method (or specific pattern).

For example, a plurality of touch electrodes having a certain size can be arranged in a matrix form depending on the size of the display device or the size of the touch panel. When a specific object (e.g., a hand or an electronic pen) touches a plurality of touch electrodes disposed on the touch panel, each touch electrode can sense the contact or proximity of the object. The touch sensing circuit can determine the location (or touch coordinates) where an object is touched based on changes in capacitance due to contact or proximity of the object.

Arrangement methods (or patterns of touch electrodes) of touch electrodes disposed on a touch panel can be implemented in various forms, and touch electrodes of the same size can typically be arranged in a matrix form.

Meanwhile, as panels become larger, and when a plurality of panels are used to implement a large screen, a plurality of touch microcontroller units are needed to acquire touch data. In this instance, as the plurality of touch microcontroller units are used, wiring becomes complicated, communication lines for touch data communication become busy, and clock and memory usage increases.

Additionally, when touch data is acquired using a plurality of panels and all raw touch data is sequentially transmitted for each panel, a problem of increased data processing occurs. When the touch coordinates are calculated for each panel and the calculated touch coordinates are transmitted, the amount of touch data transmission can be reduced, but a problem occurs in which touch accuracy at the boundary between the panels is reduced.

SUMMARY OF THE DISCLOSURE

The purpose of the embodiment is to provide a touch sensing circuit that can calculate touch coordinates and transmit touch data by defining a master integrated circuit and a slave integrated circuit while using a plurality of touch microcontrollers to acquire touch data from the panel.

Another purpose of the embodiment is to reduce the communication line busy phenomenon that occurs during the touch data transmission process in the touch microcontroller unit by transmitting raw touch data in a boundary area of the multiple panel and transmitting coordinate data in a non-boundary area, and improve the accuracy of touch coordinate calculation at the boundary between the panels.

According to one aspect of the embodiment to achieve the above or other objects, a touch microcontroller unit comprises a touch data acquisition circuit configured to acquire touch data of a first area and touch data of a second area of a first panel. The touch microcontroller unit comprises an area division boundary calculation circuit configured to calculate a boundary in the first panel to divide the first area and the second area. The touch microcontroller unit comprises a touch coordinate calculation circuit configured to calculate touch coordinates of the first area based on the touch data of the first area. The touch microcontroller unit comprises a touch data transmission circuit configured to transmit the touch coordinates of the first area and the touch data of the second area to another touch microcontroller unit.

According to another aspect of the embodiment to achieve the above or other purposes, a touch microcontroller unit comprises a touch data acquisition circuit configured to receive touch coordinates of a first area of a first panel and touch data of a second area of the first panel, and acquire touch data of a third area and touch data of a fourth area of a second panel. The touch microcontroller unit comprises; an area division boundary calculation circuit configured to calculate a boundary in the second panel to divide the third area and the fourth area. The touch microcontroller unit comprises a touch coordinate calculation circuit configured to calculate touch coordinates of the third area based on the touch data of the third area of the second panel. The touch coordinate calculation circuit is configured to calculate touch coordinates of a boundary area between the first panel and the second panel by integrating the touch data of the second area of the first panel and the touch data of the fourth area of the second panel.

According to another aspect of the embodiment to achieve the above or other purposes, a touch sensing circuit comprises a first touch microcontroller unit configured to acquire touch data of a first panel and calculate touch coordinates of the first panel. The touch sensing circuit comprises a second touch microcontroller unit configured to acquire touch data of a second panel and calculates touch coordinates of the second panel. The first touch microcontroller unit is configured to calculate a boundary in the first panel to divide a first area and a second area, calculate touch data of the first area of the first panel to acquire touch coordinates, and not to calculate touch coordinates for the touch data of the second area of the first panel. The first touch microcontroller unit is configured to transmit the touch coordinates of the first area and the touch data of the second area to the second touch microcontroller unit.

As described above, according to the embodiment, even if a plurality of touch microcontroller units are used as the panel becomes larger, wiring can be simplified and the busy communication line phenomenon for low touch data communication can be resolved.

According to the embodiment, a plurality of controller units can reduce data throughput by calculating touch coordinates only in some areas of the panel, and effectively reduce communication line busy phenomenon and increased clock and memory usage.

BRIEF DESCRIPTION OF THE DRAWINGS

FIG. 15 is a flowchart of a touch sensing method according to an embodiment.

DETAILED DESCRIPTION OF EMBODIMENTS

Figure 1:
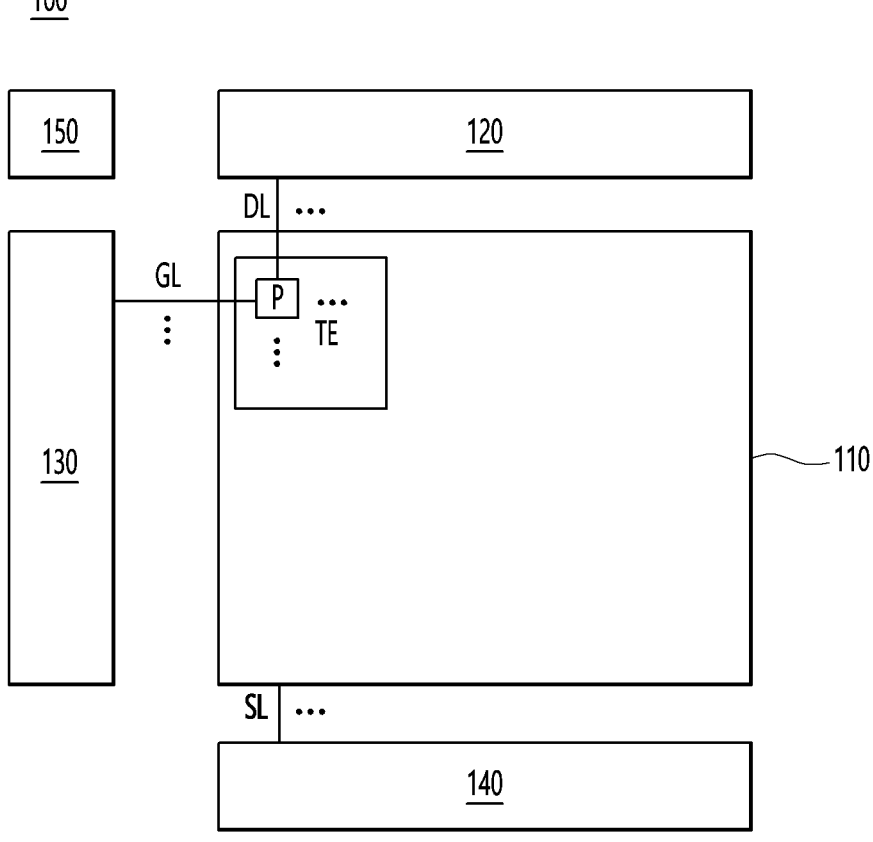
FIG. 1 is a configuration diagram of a display device according to an embodiment.

FIG. 1 is a configuration diagram of a display device according to an embodiment.

As shown in FIG. 1, the display device 100 according to the embodiment can perform a display function and a touch sensing function. The display device 100 according to the embodiment can be implemented as a flat panel display such as a liquid crystal display (LCD) or an organic light emitting diode (OLED) display.

Referring to FIG. 1, the display device 100 can comprise a panel 110, a data driving circuit 120, a gate driving circuit 130, a touch sensing circuit 140, a timing controller 150, etc.

The panel 110 can comprise a plurality of data lines DL connected to the data driving circuit 120, and a plurality of gate lines GL connected to the gate driving circuit. Additionally, a plurality of pixels P can be defined at crossing of the plurality of data lines DL and the plurality of gate lines GL in the panel 110.

The panel 110 can comprise a display panel and a touch screen panel (TSP). Here, the display panel and the touch panel can share some components with each other. For example, a plurality of touch electrodes TE can be one component of a display panel (e.g., a common electrode for applying a common voltage) and at the same time can be one component of a touch panel (touch electrodes for detecting a touch). Additionally, the panel 110 can be an in-cell type panel in which some components of the display panel and the touch panel are shared with each other, but is not limited thereto.

The data driving circuit 120 can receive a data control signal from the timing controller 150 and supply a data signal to the data line DL to display an image in each pixel P of the panel 110.

The gate driving circuit 130 can receive a gate control signal from the timing controller 150 and sequentially supply a scan signal to the gate line GL to turn on or off the transistor located in each pixel P.

The touch sensing circuit 140 can apply a touch driving signal to all or part of a plurality of touch electrodes TE connected to the touch sensing line SL.

In order for the touch sensing circuit 140 to apply a touch driving signal to all or part of the plurality of touch electrodes TE, a touch sensing line SL connected to each of the plurality of touch electrodes TE is required. Accordingly, the touch sensing line SL connected to each of the plurality of touch electrodes TE and transmitting the touch driving signal can be formed in the first direction (e.g., vertical direction) or the second direction (e.g., horizontal direction) on the panel 110.

Meanwhile, the display device 100 can adopt a capacitive touch method that recognizes the proximity or touch of an object by detecting changes in capacitance through the touch electrode TE. The capacitive touch method can comprise a mutual capacitance touch method and a self-capacitance touch method. The embodiment may apply the capacitive touch method, but is not limited thereto.

Meanwhile, the display device 100 can drive the touch electrode TE in time division by dividing the display time period and the touch time period. As an example, the touch circuit 140 of the display device 100 may not apply a driving signal to all or part of the touch electrode TE during a section in which a data signal is supplied.

Additionally, the display device 100 can drive the touch electrode TE without distinguishing between the display time period and the touch time period. As an example, the touch circuit 140 of the display device 100 can apply a driving signal to all or part of the touch electrode TE in a section where a data signal is supplied.

The timing controller 150 can supply various control signals to the data driving circuit 120, the gate driving circuit 130, and the touch circuit 140. The timing controller 150 can transmit a data control signal that controls the data driving circuit 120 to supply a data voltage to each pixel (P) according to each timing, transmit a gate control signal to the gate driving circuit 130, or transmit a sensing control signal using the touch sensing signal. The timing controller 150 can also perform other control functions.

The panel 110 of the display device 100 can comprise a plurality of separated panels. In this instance, imbalance can occur in the process of acquiring touch data due to the characteristics of the plurality of panels, touch sensing time, and deviations in the touch microcontroller unit used, etc. Even when a single touch event actually occurs, multiple touch events may be mistakenly recognized as having occurred while processing each panel. This phenomenon can become more severe when the plurality of panels perform individual touch data acquisition and calculation by independent touch microcontrollers. For example, when the plurality of panels are seamlessly connected, the user may not recognize that the plurality of panels are separated. However, due to the structure of the actual electric circuit, the plurality of panels can be separated, and a plurality of touch microcontroller units can be individually calculated to derive touch coordinates. Therefore, a touch sensing device and a touch sensing method are needed to improve the accuracy of touch data communication and calculation of a plurality of touch microcontroller units.

Figure 2:
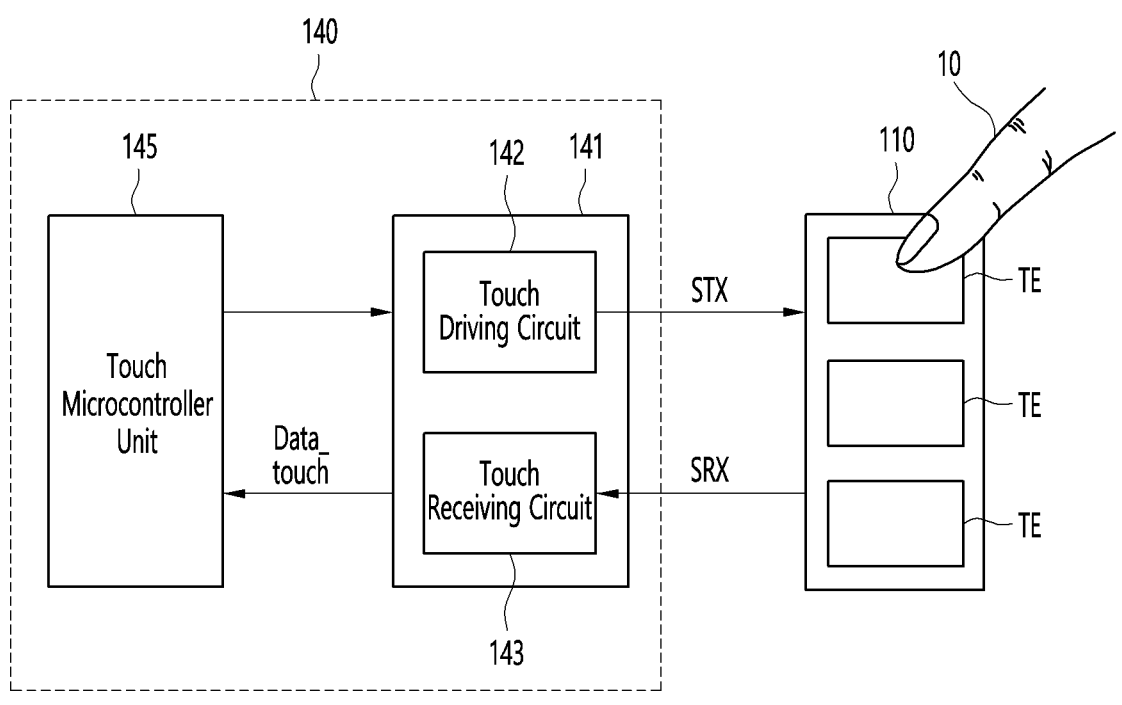
FIG. 2 is a configuration diagram of a touch sensing circuit according to an embodiment.

FIG. 2 is a configuration diagram of a touch sensing circuit according to an embodiment.

Referring to FIG. 2, the touch sensing circuit 140 can comprise a readout circuit 141, a touch microcontroller unit 145, etc. The touch microcontroller unit 145 can be called as a touch microcontroller or a touch microcontroller circuit.

The readout circuit 141 can comprise a touch driving circuit 142, a touch receiving circuit 143, etc. The touch driving circuit 142 can transmit a touch driving signal STX to the touch electrode TE of the panel 110, and the touch receiving circuit 143 can receive e touch sensing signal SRX from the touch electrode TE.

The readout circuit 141 can receive a touch sensing signal SRX of a size corresponding to the change in capacitance in the form of current or voltage, demodulate the touch sensing signal SRX to generate touch data Data_touch, and generate the touch data Data_touch to the touch microcontroller unit 145. The touch data Data_touch can be defined as touch sensing value converted into digital form.

The touch microcontroller unit 145 can receive the touch data Data_touch, determine the touch or proximity of the object 10 to the panel 110, and control an operation of the readout circuit 141.

The touch driving circuit 142 of the readout circuit 141 can transmit an uplink signal UL to a stylus pen through the touch electrode TE. When the stylus pen touches the panel 110 including the touch electrode TE or approaches the panel 110 within a certain distance, the stylus pen can receive an uplink signal UL. The uplink signal UL can be transmitted from part or all of the panel 110 to the stylus pen.

The touch receiving circuit 143 of the touch sensing circuit 140 can receive a downlink signal DL from the stylus pen through the touch electrode TE. The downlink signal DL can be transmitted to the touch electrode TE located at a point touched or approached by the stylus pen.

The touch sensing circuit 140 can determine the presence or absence of touch, touch location, touch intensity, touch interval, etc. according to the change in capacitance of the touch electrode TE according to the touch or approach of the object.

Figure 3:
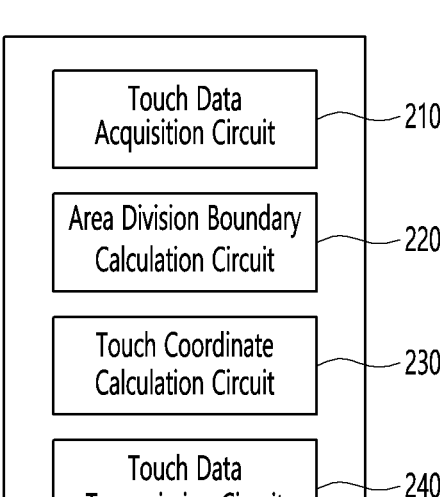
FIG. 3 is a configuration diagram of a touch microcontroller unit according to an embodiment.

FIG. 3 is a configuration diagram of a touch microcontroller unit according to an embodiment.

Referring to FIGS. 2 and 3, the touch microcontroller unit 145 can comprise a touch data acquisition circuit 210, an area division boundary calculation circuit 220, a touch coordinate calculation circuit 230, and a touch data transmission circuit 240, etc.

The touch data acquisition circuit 210 can acquire a touch sensing value in response to the amount of voltage change or capacitance change formed in the touch electrode TE. The readout circuit 141 can perform an operation of converting a touch sensing value in the form of an analog signal into touch data in a digital form. The touch data can be data of a size proportional to the touch sensing value, but is not limited thereto. For example, the touch data can be data acquired through calculation, such as a delta value acquired by subtracting the base value from the touch sensing value.

The touch microcontroller unit 145 can determine whether or not there is a touch based on size, distribution, etc. of the touch data Data_touch. For example, the touch microcontroller unit 145 can determine that a touch has occurred in an area of the panel having touch data exceeding the threshold. The touch coordinates can be calculated by performing a touch coordinate calculation algorithm based on the distribution of touch data that exceeds the threshold, or a boundary of the panel where the touch occurred can be extracted by performing a touch boundary calculation algorithm.

The touch data acquisition circuit 210 can acquire touch data of a first area and a second area of a first panel among the plurality of panels. The first area among the entire areas of the first panel can be a non-boundary area far from the boundary formed between the panels, and the second area among the entire areas of the first panel can be a boundary area adjacent to the boundary formed between the panels.

Additionally, the touch data acquisition circuit 210 can acquire touch data of a third area and a fourth area of a second panel. The third area of the entire area of the second panel can be a non-boundary area far from the boundary formed between the panels, and the fourth area of the entire area of the second panel can be a boundary area adjacent to the boundary formed between the panels.

When the first panel and the second panel meet to form a boundary, the second area of the first panel and the fourth area of the second panel may be defined as a boundary area, and the first area of the first panel and the third area of the second panel may be defined as a non-boundary area. The touch microcontroller unit 145 can integrate touch data from the second area of the first panel and the third area of the second panel to determine whether a touch occurs in the boundary area or perform touch coordinate calculation and touch boundary calculation. If the touch microcontroller unit 145 does not perform a touch algorithm by synthesizing the touch data of the boundary area, each panel can recognize that one touch has occurred. Thus, from the user's perspective, inaccurate touch sensing is performed even if a single touch is made.

The touch microcontroller unit 145 can be a single touch microcontroller unit, but can comprise a plurality of touch microcontroller units that acquire and calculate touch data for each of a plurality of panels. In this instance, each of the plurality of touch microcontroller units can acquire and calculate touch data in correspondence with one or more touch panels.

The touch microcontroller unit 145 can comprise a first touch microcontroller unit that acquires touch data and calculates coordinates of the first and second areas of the first panel, and a second touch microcontroller unit that acquires touch data and calculates coordinates of the third and fourth areas of the second panel.

The touch microcontroller unit 145 can comprise a third touch microcontroller unit that collects touch data of the second area of the first panel and touch data of the fourth area of the second panel, aligns the touch data based on a boundary baseline between the first panel and the second panel, and calculates one or more touch coordinates near the boundary baseline.

The third touch microcontroller unit can acquire and calculate touch data or touch coordinates of each of the first and second panels from the first touch microcontroller unit and the second microcontroller unit, but can further perform an operation to calculate touch coordinates by acquiring touch data of the third panel. In this instance, the third touch microcontroller unit can comprise a master integrated circuit, and the first and second touch microcontroller units can comprise slave integrated circuits. In this way, the size of the circuit can be effectively reduced by collecting and calculating data in the third touch microcontroller unit without including a separate controller for collecting and managing data of the first to third touch microcontroller units.

The area division boundary calculation circuit 220 can be a circuit that calculates a boundary dividing the first area and the second area in the first panel. The first area of the first panel can be an area that is not adjacent to the boundary of another panel, and the second area can be an area adjacent to the boundary of another panel.

The area division boundary calculation circuit 220 can divide the area at a certain distance from the boundary between the panels. The boundary for area division can be adjusted differently depending on the distribution of touch data near the boundary. The area division boundary calculation circuit 220 can repeatedly update the boundary setting for area division every frame and repeat this update whenever touch data is acquired. The area division boundary calculation circuit 220 can repeatedly update the boundary setting for area division when a change in touch data occurs.

The area division boundary calculation circuit 220 may be a circuit that calculates a boundary dividing the third area and the fourth area in the second panel. The third area of the second panel may be an area that is not adjacent to the boundary of another panel, and the fourth area may be an area adjacent to the boundary of another panel.

If the second panel is also disposed adjacent to the third panel, a fifth area, which is a boundary area, can be further set based on the boundary of the second and third panels. In this instance, a part of the third area can be defined as the fifth area, but boundary areas and non-boundary areas of various shapes can be defined depending on the arrangement and connection relationship of the panels.

The area division boundary can vary depending on the distribution of touch data. The area division boundary can be defined as a dynamic boundary that can be varied depending on the computing power of the touch microcontroller unit.

The touch coordinate calculation circuit 230 can be a circuit that calculates touch coordinates based on touch data. The touch coordinate, etc. can be calculated by acquiring touch data within the panel based on raw touch data or delta touch data that is a deviation from base touch data.

The touch coordinate calculation circuit 230 can acquire an area of the panel where touch data exceeding the threshold exists and perform calculations by matching the two-dimensional coordinates and the touch data. The touch coordinate calculation circuit 230 can calculate the coordinate with the maximum value by expressing the two-dimensional coordinates and the size of the touch data in three-dimensional form, or calculate the point—for example, the coordinate where the touch occurred by considering the distribution of the touch data.

The touch coordinate calculation circuit 230 can preferentially calculate the touch coordinates of the first area in the first panel. The touch coordinate calculation circuit 230 can preferentially calculate the touch coordinates of the third area in the second panel. The touch coordinate calculation circuit 230 can calculate touch coordinates by integrating touch data of the second area in the first panel and the fourth area in the second panel. In this way, the amount of data transmission can be reduced by calculating touch coordinates in non-boundary areas based on the boundaries of the plurality of panels, and touch coordinate calculation accuracy can be improved by integrating touch data in boundary areas.

The touch data transmission circuit 240 can be a circuit that transmits touch data acquired from each panel to another circuit—for example, a processor, another touch microcontroller unit, etc.

When the touch microcontroller unit 145 comprises first to third touch microcontroller units, each touch microcontroller unit can transmit touch data and touch coordinates to each other.

The touch data communication circuit 240 can be a circuit that transmits and receives touch data acquired and calculated by the touch microcontroller unit to another touch microcontroller unit or internal and external circuits.

The touch data communication circuit 240 can transmit touch coordinates of the first area and touch data of the second area of the first panel, and transmit touch coordinates of the third area and touch data of the fourth area of the second panel. The touch coordinate calculation circuit 230 can integrate the touch data of the second area from the first panel and the fourth area from the second panel transmitted by the touch data communication circuit 240 to calculate the touch coordinates of a touch event that occurred near the boundary of the panel.

As another example, the touch data acquisition circuit 210 of the touch microcontroller unit 145 can receive the touch coordinates of the first area of the first panel and the touch data of the second area of the first panel, and acquire touch data of the third and fourth areas of the second panel.

The touch data acquisition circuit 210 can receive touch coordinates and touch data from a slave touch microcontroller unit that calculates touch coordinates of the first area and touch data of the second area of the first panel.

The area division boundary calculation circuit 220 of the touch microcontroller unit 145 can calculate a boundary dividing the third area and the fourth area of the second panel. The area division boundary calculation circuit 220 can divide the third area and the fourth area of the second panel at a certain distance from the boundary baseline formed by meeting the first panel and the second panel. Various boundary dividing methods can be applied, but are not limited thereto. The area division boundary calculation circuit 220 can differentially apply or vary a reference distance away from the boundary baseline based on the distribution of touch data occurred near the boundary.

The touch coordinate calculation circuit 230 of the touch microcontroller unit 145 can calculate the touch coordinates of the third area based on the touch data of the third area of the second panel. The touch coordinate calculation circuit 230 can determine that the fourth area is a boundary area of the panel, and integrate the touch data of the second area of the first panel and the touch data of the fourth area of the second panel to calculate the touch coordinate of the boundary area between the first panel and the second panel.

The touch data transmission circuit 240 of the touch microcontroller unit 145 can selectively or simultaneously transmit one or more of the touch coordinates of the first area of the first panel, the touch coordinates of the third area of the second panel, and the touch coordinates of the boundary area between the first panel and the second panel. When a touch does not occur in the first area of the first panel or a touch does not occur in the third area of the second panel, the touch coordinate calculation circuit 230 may not calculate the touch coordinates of the first area of the first panel or the third area of the second panel, and the touch data transmission circuit 240 mays not transmit the touch coordinates of the first area of the first panel or the third area of the second panel. In this instance, the touch data transmission circuit 240 can transmit only the touch coordinates of the boundary area between the first panel and the second panel.

The touch data transmission circuit 240 of the touch microcontroller unit 145 can transmit the touch coordinates of the first panel and the second panel to the master touch microcontroller unit that determines the touch coordinates of the first panel and the second panel. The master touch microcontroller unit can synthesize all touch events occurring on the first panel and/or the second panel and calculate final touch coordinates.

Figure 4:
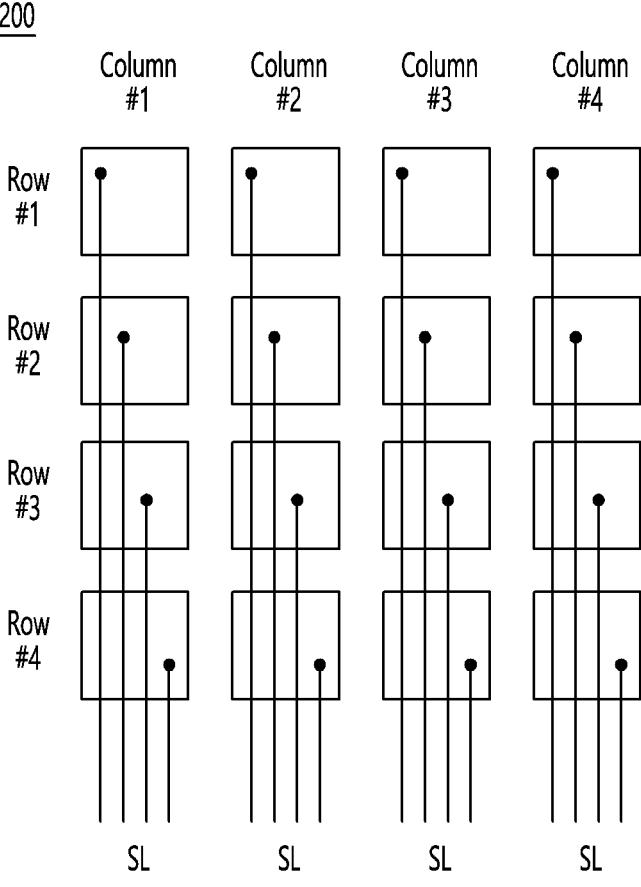
FIG. 4 is a diagram illustrating the shape of a touch electrode disposed on a panel according to an embodiment.

FIG. 4 is a diagram illustrating the shape of a touch electrode disposed on a panel according to an embodiment.

Referring to FIG. 4, a plurality of touch electrodes of the same type can be separated and disposed on the panel 200.

In this instance, one touch sensing line SL can be electrically connected to each touch electrode, and the touch sensing value can be acquired from each touch electrode, allowing accurate touch calculation.

For example, when touch electrodes are arranged in N columns (N is a natural number greater than 2) and M rows (M is a natural number greater than 2), N*M touch nodes and touch sensing lines can be used. Various types of touch electrodes, but not limited thereto, can be implemented on the panel.

The touch electrode of the embodiment, but are not limited to the shape shown in FIG. 4, can be an touch electrode of various shapes.

Figure 5:
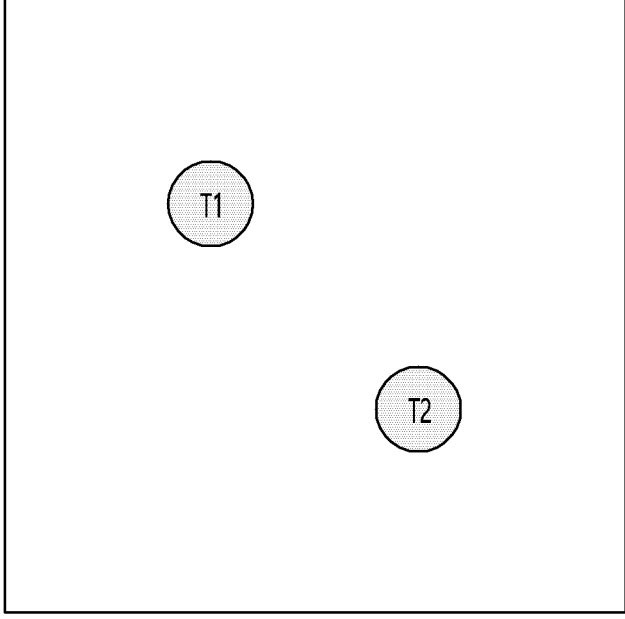
FIG. 5 is a diagram illustrating a process for recognizing a touch by acquiring touch data from a panel according to an embodiment.

FIG. 5 is a diagram explaining the process of acquiring touch data from a general panel and recognizing a touch.

Referring to FIG. 5, the panel 300 having 144 touch nodes can sense a touch by acquiring alternative touch data for each touch electrode.

For example, if the threshold value is set to indicate that a touch occurred when the size of the touch data is 100 or more, it can be recognized that two touch areas T1 and T2 exist.

One or more touches can occur on the panel 300, and even when a display device uses the plurality of panels, touch data can be acquired and touch coordinates calculated in the same manner.

in FIG. 5, one panel can be provided, but it can be understood as a plurality of panels arranged in succession, and various modified embodiments are not limited thereto.

Figure 6:
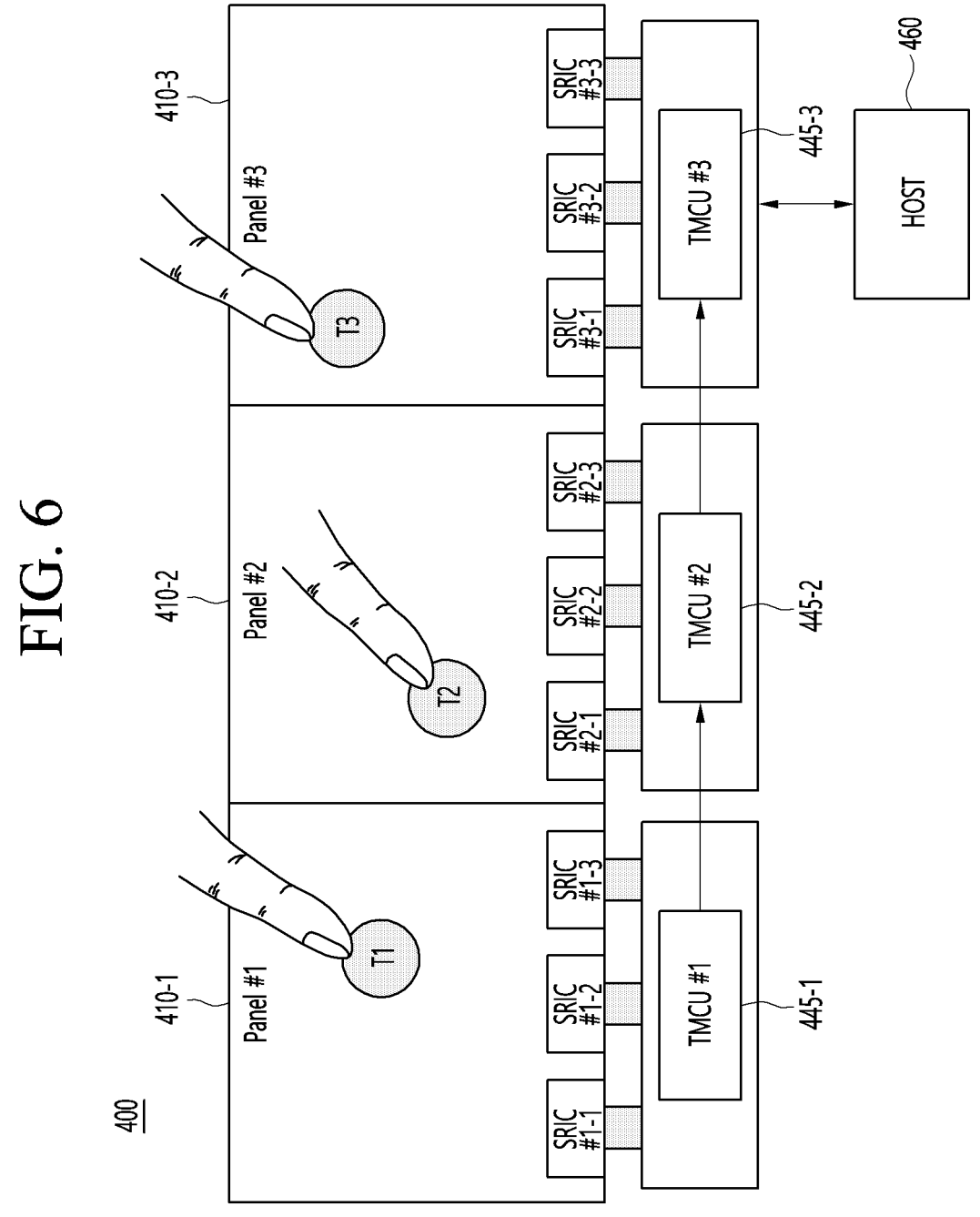
FIG. 6 is a first example diagram explaining a communication method of a touch microcontroller unit according to an embodiment.

FIG. 6 is a first example diagram explaining a communication method of a touch microcontroller unit according to an embodiment.

Referring to FIG. 6, the touch sensing circuit 400 can comprise first to third microcontroller units 445-1, 445-2, and 445-3.

The first to third source read-out integrated circuits SRIC #1-1, SRIC #1-2 and SRIC #1-3 disposed on the first panel 410-1 can transmit the data voltage of the first panel 410-1 and the touch sensing value (touch data) of the first panel 410-11—for example, the amount of voltage change and the amount of capacitance change—to the first touch microcontroller unit 445-1. Touch data can be acquired in the same way in the first to third source read-out integrated circuits SRIC #2-1, SRIC #2-2 and SRIC #2-3 disposed on the second panel 410-2 and the first to third source read-out integrated circuits SRIC #3-1, SRIC #3-2 and SRIC #3-3 disposed on the third panel 410-3.

The first to third panels 410-1, 410-2, and 410-3 can have a sequentially connected structure, and the first to third microcontroller units 445-1, 445-2 and 445-3 can also have a structure in which touch data and touch coordinates are sequentially transmitted and transferred to the host 460.

The first to third touch microcontroller units 445-1, 445-2 and 445-3 can be arranged one by one for each panel 410-1, 410-2 and 410-3 or each substrate, the plurality of touch microcontroller units 445-1, 445-2 and 445-3 can be sequentially connected and used as one touch microcontroller unit. In this way, the size of the panel can be reduced by using a small touch microcontroller unit without increasing the size of the touch microcontroller unit.

The touch microcontroller units 445-1, 445-2 and 445-3 of each panel 410-1, 410-2 and 410-3 can acquire and process the touch data of their own panel, and receive and process touch data from other touch microcontroller units of the connected panel.

For example, when the first touch microcontroller unit 445-1 can be set as a slave integrated circuit and the second touch microcontroller unit 445-2 can be set as a master integrated circuit, the touch data from the first touch microcontroller unit 445-1 can be transmitted to the second touch microcontroller unit 445-2.

For example, when the second touch microcontroller unit 445-2 can be set as a slave integrated circuit and the third touch microcontroller unit 445-3 can be set as a master integrated circuit, the touch data from the second touch microcontroller unit 445-2 can be transmitted to the third touch microcontroller unit 445-3.

For example, when the third touch microcontroller unit 445-3 can be set as a slave integrated circuit and the host 160 can be set as a master integrated circuit, the touch data of the third touch microcontroller unit 445-3 can be transmitted to the host 160.

The host 160 can be a processor such as a application processor (AP) of a mobile device, and also be a variety of external devices such as a PC, NBPC, tablet, or smartphone, but is not limited thereto. A device capable of exchanging data with the host 160 and performing operations can be used.

In the master-slave connection structure described above, the second touch microcontroller unit 445-2 can acquire and calculate the touch data generated by the touch event T1 of the first panel 410-1 and the touch event T2 of the second panel 410-1, and the third touch microcontroller unit 445-3 can acquire and calculate the touch event T3 of the third panel 410-3 as well as the touch data T1 and T2 of each of the first panel 410-1 and the second panel 410-2.

The first to third microcontroller units 445-1, 445-2 and 445-3 can transmit and receive raw touch data or touch coordinates using SPI, USB, I2C, etc., and the third touch microcontroller unit 445-3 located last can communicate with the host 460.

In the embodiment, the number, arrangement, and connection structure of the panel, source read-out integrated circuit, and touch microcontroller unit are exemplary, and the technical idea of the embodiment is not limited thereto and can have various modified embodiments.

Figure 7:
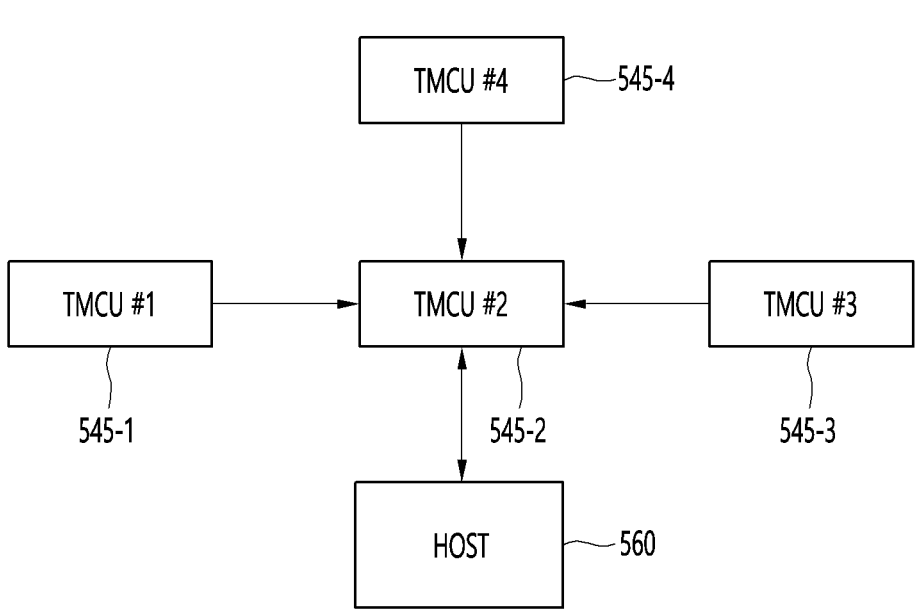
FIG. 7 is a second example diagram explaining a communication method of a touch microcontroller unit according to an embodiment.

FIG. 7 is a second example diagram explaining a communication method of a touch microcontroller unit according to an embodiment.

Referring to FIG. 7, in the touch sensing circuit 500, the touch microcontroller units 545-1, 545-2, 545-3, and 545-4 can be connected in different ways to acquire and transmit touch data.

In the panel 500, the first touch microcontroller unit 545-1, the third touch microcontroller unit 545-3, and the fourth touch microcontroller unit 545-4 can comprise slave integrated circuits, and the second touch microcontroller unit 545-2, which a master integrated circuit, can be a connected to the first, third and fourth touch microcontroller units 545-1, 545-3, and 545-4.

The second touch microcontroller unit 545-2, which is a master integrated circuit, can operate the touch data of its panel, and also process touch data from each of the connected slave integrated circuits, that is, the first, third, and fourth touch microcontroller units 454-1, 454-3, and 454-4. The second touch microcontroller unit 545-2 can calculate touch coordinates by calculating touch data of itself 545-2 and each of the other touch microcontroller units 545-1, 545-3, and 545-4, and communicate with the host 560.

Figure 8:
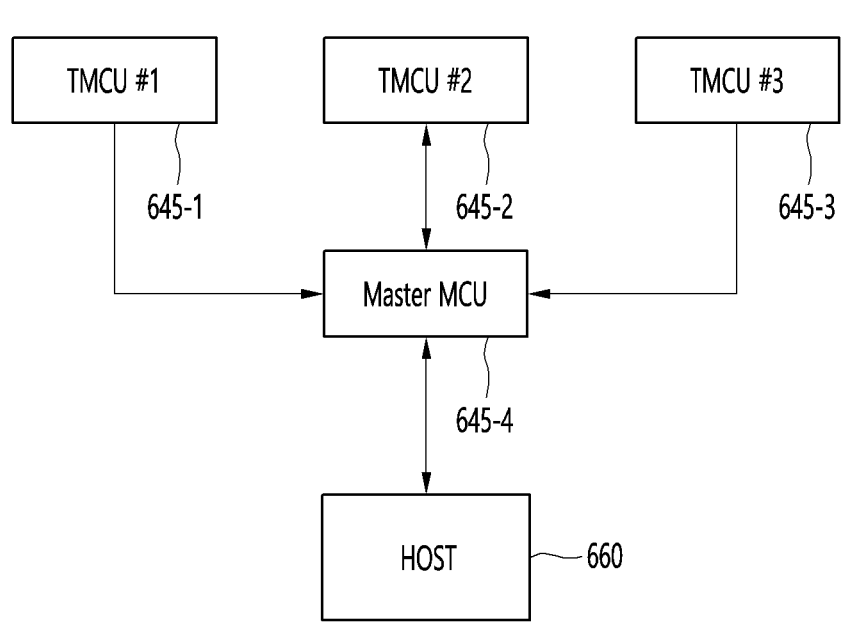
FIG. 8 is a third example diagram explaining a communication method of a touch microcontroller unit according to an embodiment.

FIG. 8 is a third example diagram explaining a communication method of a touch microcontroller unit according to an embodiment.

Referring to FIG. 8, in the touch sensing circuit 600, the touch microcontroller units 645-1, 645-2, 645-3, and 645-4 can be connected in another way to acquire and transmit touch data.

In the panel 600, the first touch microcontroller unit 645-1, the second touch microcontroller unit 645-2, and the third touch microcontroller unit 645-3 can comprise slave integrated circuits, and the fourth touch microcontroller unit 645-4, which is a master integrated circuit, can be connected to the first to third touch microcontroller units 645-1, 645-2, and 645-3.

The fourth touch microcontroller unit 645-4, which is the master integrated circuit, does not operate the touch data of its own panel, but only process touch data from the connected slave integrated circuits, that is, each of the first to third touch microcontroller units 654-1, 654-2, and 645-3. The fourth touch microcontroller unit 645-4 can calculate touch coordinates by calculating touch data of itself 645-4 and each of the other touch microcontroller units 645-1, 645-2, and 645-3, and communicate with the host 660.

FIG. 6 to FIG. 8 illustrate the connection relationship of the touch microcontroller, and TDDI or Add-on touch integrated circuits, rather than source read-out integrated circuits, can be used in the panel. Additionally, the connection method and number of panels can be formed in various ways, such as sequentially connected in series, matrix, or cross.

Figure 9:
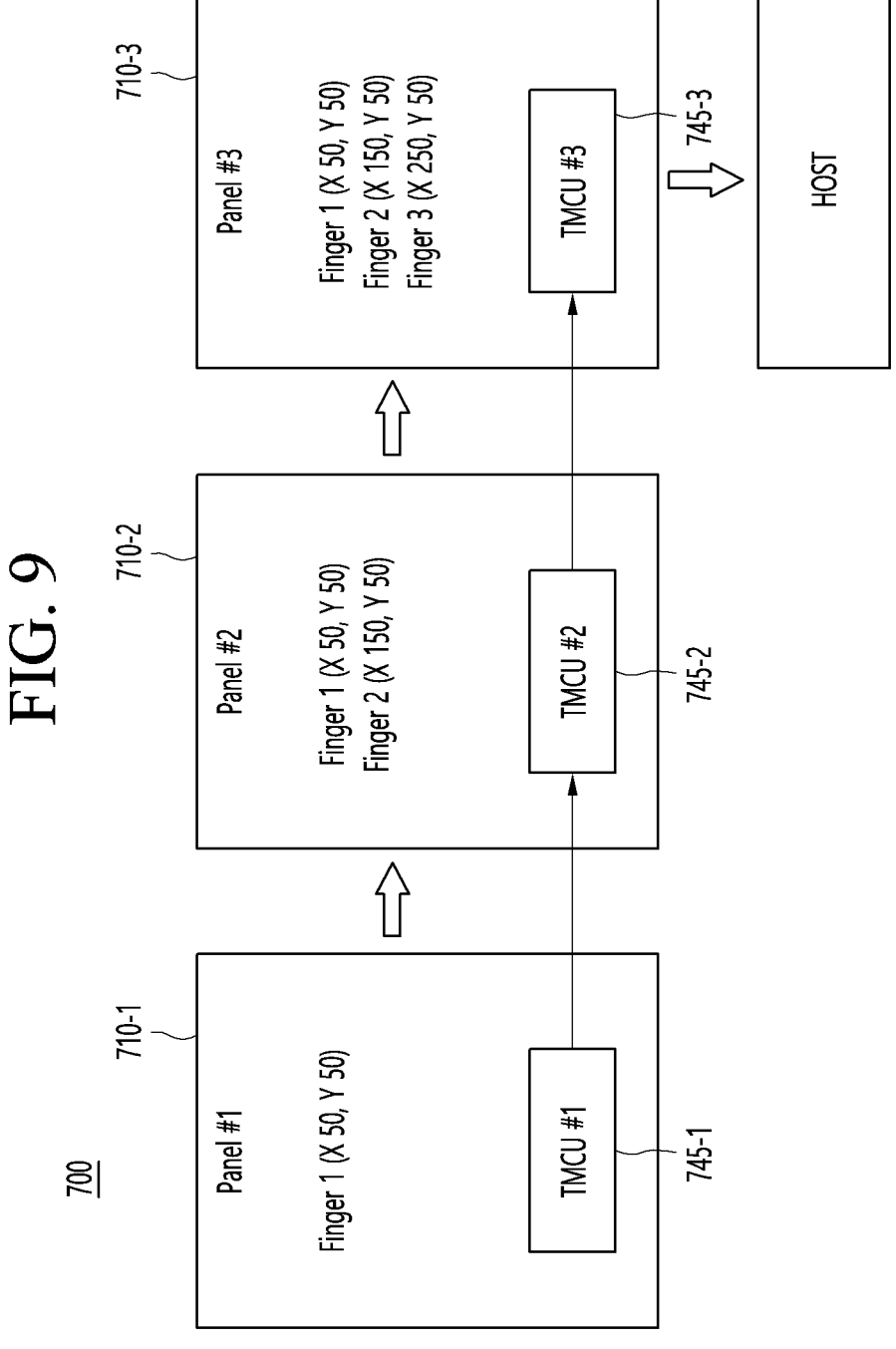
FIG. 9 is a first example diagram explaining a method of calculating touch coordinates and transmitting and receiving touch data of a touch microcontroller unit according to an embodiment.

FIG. 9 is a first example diagram explaining a method of calculating touch coordinates and transmitting and receiving touch data of a touch microcontroller unit according to an embodiment.

Referring to FIG. 9, the touch sensing circuit 700 can comprise first to third touch microcontroller units 745-1, 745-2, and 745-3.

A coordinate transmission method can be adopted in which the first to third touch microcontroller units (745-1, 745-2, 745-3) can calculate the touch coordinates of their panels in each slave integrated circuit and transmit calculate the touch coordinates to the master integrated circuit and the master integrated circuit can calculate the final touch coordinates and transmits the final touch coordinates to the host.

When a touch of the first finger occurs on the first panel 710-1, the first touch microcontroller unit 745-1 disposed on the first panel 710-1 can calculate touch coordinates—for example, X 50, Y 50—and transmit the calculated touch coordinates to the second touch microcontroller unit 745-2 disposed on the second panel 710-2.

When a touch of a second finger occurs on the second panel 710-2, the second touch microcontroller unit 745-2 disposed on the second panel 710-2 can calculate the touch coordinates—for example, X 50, Y 50—, and transmit the calculated touch coordinates to the third touch microcontroller unit 745-3 disposed on the third panel 710-3. The second touch microcontroller unit 745-2 disposed on the second panel 710-2 can calculate together with the data received from the first touch microcontroller unit 745-1. In this instance, the touch coordinates of the first panel 710-1 can be changed to X 50, Y 50, and the touch coordinates of the second panel 710-2 may be changed to X 150, Y 150. The third touch microcontroller unit 745-3 can receive the first finger touch coordinates of the first panel 710-1, i.e., X 50 and Y 50, and the second finger touch coordinates of the second panel 710-2, i.e., X 150 and Y 150.

When a touch of a third finger occurs on the third panel 710-3, the third touch microcontroller unit 745-3 disposed on the third panel 710-3 can calculate the touch coordinates—for example, X 50, Y 50—, and transmit the calculated touch coordinates to the host. The third touch microcontroller unit 745-3 disposed on the third panel 710-3 can calculate together with the touch data received from each of the touch microcontroller unit 745-1 and the second touch microcontroller unit 745-2. In this instance, the touch coordinates of the third panel 710-3 can be changed to X 250 and Y 50. The third touch microcontroller unit 745-3 can calculate the first finger touch coordinates of the first panel 710-1, i.e., X 50 and Y 50, the second finger touch coordinates of the second panel 710-2, i.e., X 150 and Y 50, and the third finger touch coordinates of the third panel 710-3, i.e., X 250 and Y 50 as the final touch coordinates and transmit the final touch coordinates to the host.

The third touch microcontroller unit 745-3 can perform a merge algorithm integrating the touch coordinates of the first to third panels 710-1, 710-2, and 710-3 to transmit the final touch coordinates to the host.

Figure 10:
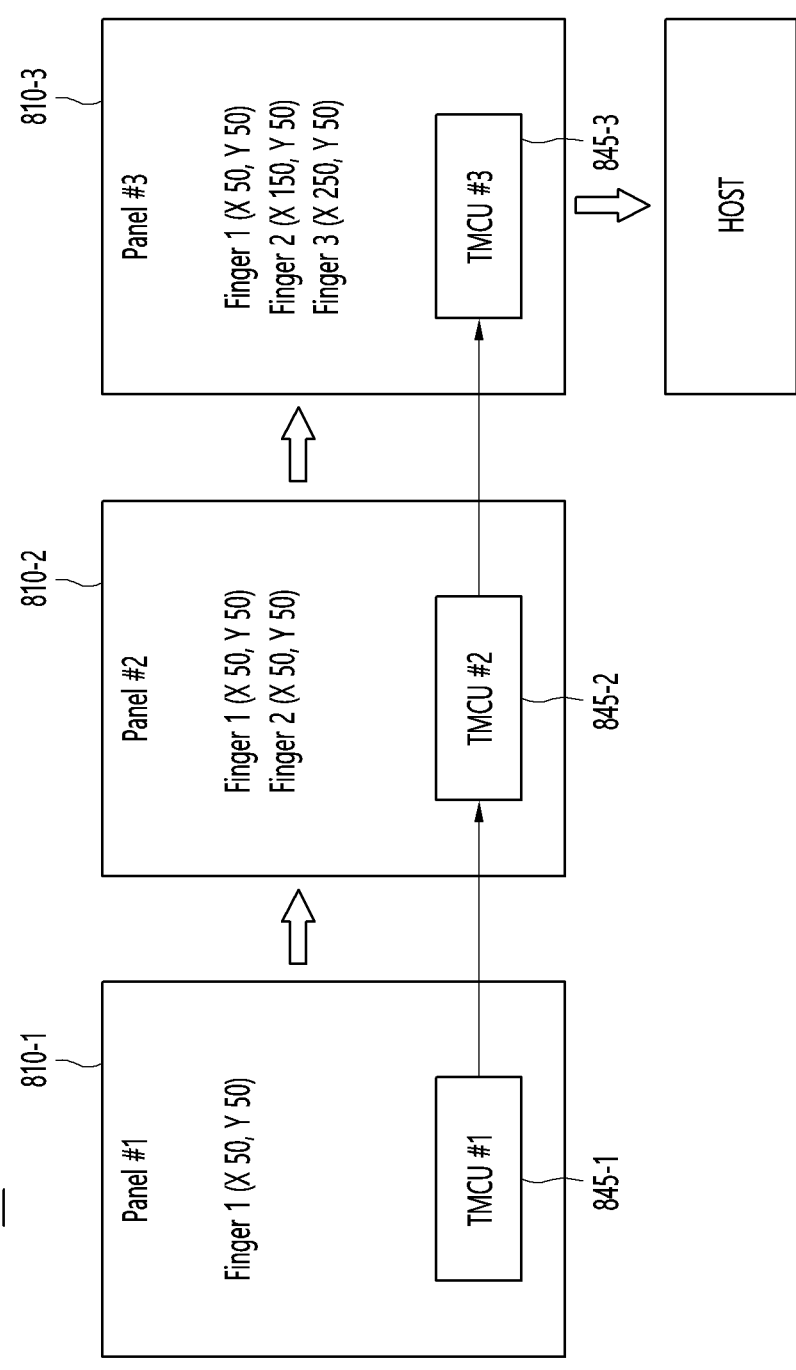
FIG. 10 is a second example diagram explaining a method of calculating touch coordinates and transmitting and receiving touch data of a touch microcontroller unit according to an embodiment.

FIG. 10 is a second example diagram explaining a method of calculating touch coordinates and transmitting and receiving touch data of a touch microcontroller unit according to an embodiment.

Referring to FIG. 10, the touch sensing circuit 800 can comprise first to third panels 810-1, 810-2, and 810-3, first to third touch microcontroller units 845-1, 845-2, 845-3, etc.

A coordinate transmission method can be adopted in which the first to third touch microcontroller units 845-1, 845-2, and 845-3 can calculate the touch coordinates of their panels in each slave integrated circuit and transmit the touch coordinates to the master integrated circuit and the master integrated circuit can calculate the final touch coordinates and transmits the final touch coordinates to the host.

The touch microcontroller unit does not update the touch coordinates each time it transmits the touch coordinates to another touch microcontroller unit, but can simplify operations by transmitting the identification code together.

The first touch microcontroller unit 845-1 can calculate the first finger touch coordinates of the first panel 810-1 as X 50 and Y 50, and assign an identification code PN1 to the touch of the first panel 810-1 to transmit the assigned identification code PN1 to the second touch microcontroller unit 845-2.

The second touch microcontroller unit 845-2 can calculate the second finger touch coordinates of the second panel 810-2 as X 150 and Y 50, and assign an identification code PN2 to the touch of the second panel 810-2. The second touch microcontroller unit 845-2 transmit the touch coordinates and identification code X 50, Y 50 and PN1 of the first panel 810-1 and the touch coordinates and identification code X 150, Y 50 and PN2 of the second panel 810-2 the third touch microcontroller unit 845-3.

The third touch microcontroller unit 845-3 can calculate the third finger touch coordinates of the third panel 810-3 as X 50 and Y 50, and assign an identification code PN3 to the touch of the third panel 810-3.

The third touch microcontroller unit 845-3 can calculate touch the first panel 810-1 at X 50 and Y 50, touch the second panel 810-2 at X 150 and Y 50, touch the third panel 810-3 at X 250 and Y 50 based on the touch coordinates and identification codes received from each of the first panel 810-1 and the second panel 810-2, and transmit the final touch coordinates to the host.

Figure 11:
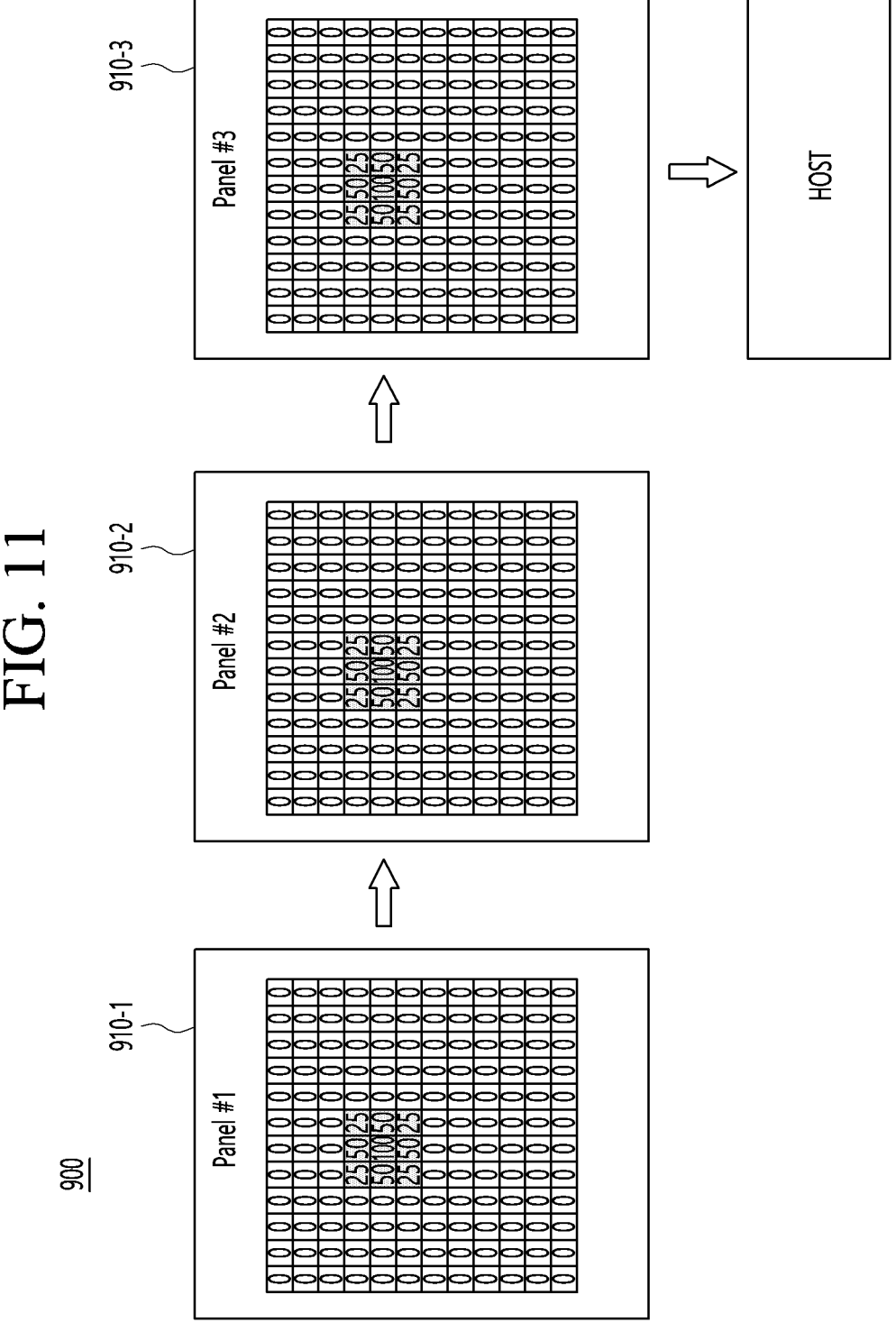
FIG. 11 is a third example diagram explaining a method of calculating touch coordinates and transmitting and receiving touch data of a touch microcontroller unit according to an embodiment.

FIG. 11 is a third example diagram explaining a method of calculating touch coordinates and transmitting and receiving touch data of a touch microcontroller unit according to an embodiment.

Referring to FIG. 11, the touch sensing circuit 900 can comprise touch microcontroller units disposed on the first to third panels 910-1, 910-2, and 910-3.

A coordinate transmission method can be adopted in which the touch microcontroller unit disposed on the panel 900 does not calculate the coordinates of each slave integrated circuit, but can transmit raw touch data or delta touch data to the master integrated circuit, and the master integrated circuit can calculate the final touch coordinates to transmit the final touch coordinates to the host.

For example, a method can be adopted such that the touch microcontroller unit of the first panel 910-1 can transmit touch data to the touch microcontroller unit of the second panel 910-2, the touch microcontroller unit of the second panel 910-2 can transmit touch data to the touch microcontroller unit of the third panel 910-3 and the touch microcontroller unit of the third panel 910-3 connected to the end can calculate touch coordinates based on the collected touch data to transmit the touch coordinates to the host.

For another example, a method can be adopted such that the touch microcontroller unit of the first panel 910-1 can transmit touch data to the touch microcontroller unit of the second panel 910-2, and the touch microcontroller unit of the second panel 910-2 can calculate the touch coordinates of each of the first panel 910-1 and the second panel 910-2. The touch microcontroller unit of the second panel 910-2 can transmit the calculated touch coordinates and raw touch data to the Nth touch microcontroller unit (N is a natural number of 2 or more). A method can be adopted such that the Nth touch microcontroller unit connected to the end can calculate the touch coordinates based on the collected touch coordinates and touch data to transmit the touch coordinates to the host.

As another example, a plurality of slave integrated circuits can be connected to have a 1:M connection relationship with the master integrated circuit (M is a natural number of 2 or more) without going through other slave integrated circuits. The touch microcontroller unit of the first panel 910-1 can directly transmit touch data to the touch microcontroller unit of the third panel 910-3, and the touch microcontroller unit of the second panel 910-2 can directly transmit touch data to the touch microcontroller unit of the third panel 910-3. The touch microcontroller unit of the third panel 910-3 can collect the touch data of each panel 910-1 and 910-2, calculate the final touch coordinates, and transmit the final touch coordinates to the host.

In this way, touch data of the entire panel can be acquired and touch coordinates can be calculated. Thus, touch events occurring in the entire panel can be accurately searched, but as raw touch data must be transmitted through multiple touch microcontroller units, a phenomenon in which the communication line becomes busy occurs.

Figure 12:
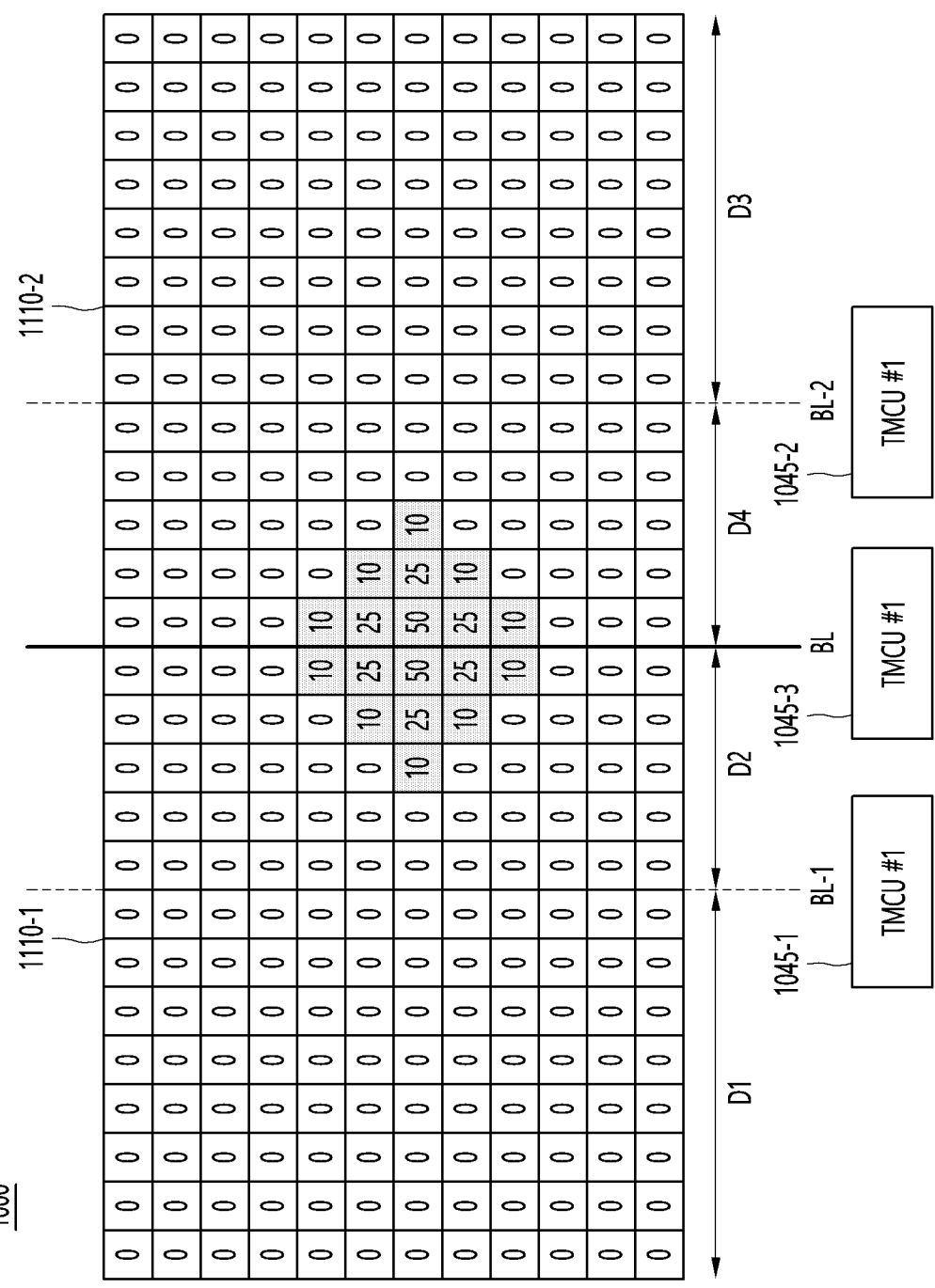
FIG. 12 is a diagram illustrating a method by which a touch microcontroller unit calculates touch coordinates in a boundary area of a panel according to an embodiment.

FIG. 12 is a diagram illustrating a method by which a touch microcontroller unit calculates touch coordinates in the boundary area of a panel according to an embodiment.

Referring to FIG. 12, the touch sensing circuit 1000 can comprise a first microcontroller unit 1045-1, a second microcontroller unit 1045-2, and the like.

The first microcontroller unit 1045-1 can acquire touch data of the first panel 1010-1 and calculate touch coordinates. The first microcontroller unit 1045-1 can calculate touch data of a first area D1 of the first panel 1010-1 to acquire touch coordinates, and may not calculate touch coordinates for touch data of a second area D2 of the first panel 1010-1.

The first microcontroller unit 1045-1 can transmit the touch coordinates of the first area D1 and the touch data of the second area D2 to the second touch microcontroller unit 1045-2.

The second microcontroller unit 1045-2 can acquire touch data of the second panel 1010-2 and calculate touch coordinates.

The second touch microcontroller unit 1045-2 can calculate touch data of a third area D3 of the second panel 1010-2 to acquire touch coordinates, and may not calculate touch coordinates for touch data of a fourth area D4 of the second panel 1010-2.

The touch sensing circuit 1000 can comprise a third touch microcontroller unit 1045-3 that receives touch data and touch coordinates of the first panel 1010-1 from the first touch microcontroller unit 1045-1, and receives the touch data and touch coordinates from the second touch microcontroller unit 1045-2. The third touch microcontroller unit 1045-3 can be understood as performing all or part of the functions of FIGS. 9 to 11 described above.

The third touch microcontroller unit 1045-3 can integrate the touch data of the second area D2 of the first panel 1010-1 and the fourth area D4 of the second panel 1010-2 to calculate the touch coordinates of a touch event occurring in the boundary area between the first panel 1010-1 and the second panel 1010-2.

The third touch microcontroller unit 1045-3 can comprise a master integrated circuit, and the first touch microcontroller unit 1045-1 and the second touch microcontroller unit 1045-2 can comprise slave integrated circuits.

The first touch microcontroller unit 1045-1 and the second touch microcontroller unit 1045-2 can transmit touch coordinates and touch data to the third touch microcontroller unit 1045-3 through sequential data transmission and reception. The first touch microcontroller unit 1045-1 can calculate the touch coordinates of the first panel 1010-1 and transmit the touch coordinates to the second touch microcontroller unit 1045-2, and the second touch microcontroller unit 1045-2 can calculate the touch coordinates of the second panel 1010-2 to transmit the touch coordinates of the first panel 1010-1 and the touch coordinates of the second panel 1010-2 to the third touch microcontroller unit 1045-3.

According to another embodiment, the first touch microcontroller unit 1045-1 and the second touch microcontroller unit 1045-2 each can communicate individually with the third touch microcontroller unit 1045-3 to transmit the touch coordinates and the touch data to the third touch microcontroller unit 1045-3.

The first area D1 and the second area D2 of the first panel 1010-1 can be divided by a boundary BL-1 spaced a certain distance from the boundary baseline BL with the second panel 1010-2. The first touch microcontroller unit 1045-1 can perform an operation to determine a boundary BL-1 for dividing the area of the first panel 1010-1 based on the distribution of touch data acquired from the first panel 1010-1.

The third area D3 and the fourth area D4 of the second panel 1010-2 can be divided by a boundary BL-2 spaced a certain distance from the boundary baseline BL with the first panel 1010-1. The second touch microcontroller unit 1045-2 can perform an operation to determine the boundary BL-2 for dividing the second panel 1010-2 based on the distribution of touch data acquired from the second panel 1010-2.

In another embodiment, the first and second touch microcontroller units 1045-1 and 1045-2 can be divided into the first area D1 and the second area D2 of the first panel 1010-1 based on a virtual boundary set at a certain distance from the boundary of the area where the touch event occurred in the first panel 1010-1, instead of the boundary baseline BL. The first and second touch microcontroller units 1045-1 and 1045-2 can perform an operation to determine a virtual boundary for dividing the area of the first panel 1010-1 or the second panel 1010-2 based on the distribution of touch data acquired from the first panel 1010-1 or the second panel (1010-2), and update the virtual boundary every frame.

FIG. 12 is an example of a method for setting a boundary baseline and area division boundary according to an embodiment, and the connection structure of a plurality of panels, area division boundary, etc. can be set in various ways.

Figure 13:
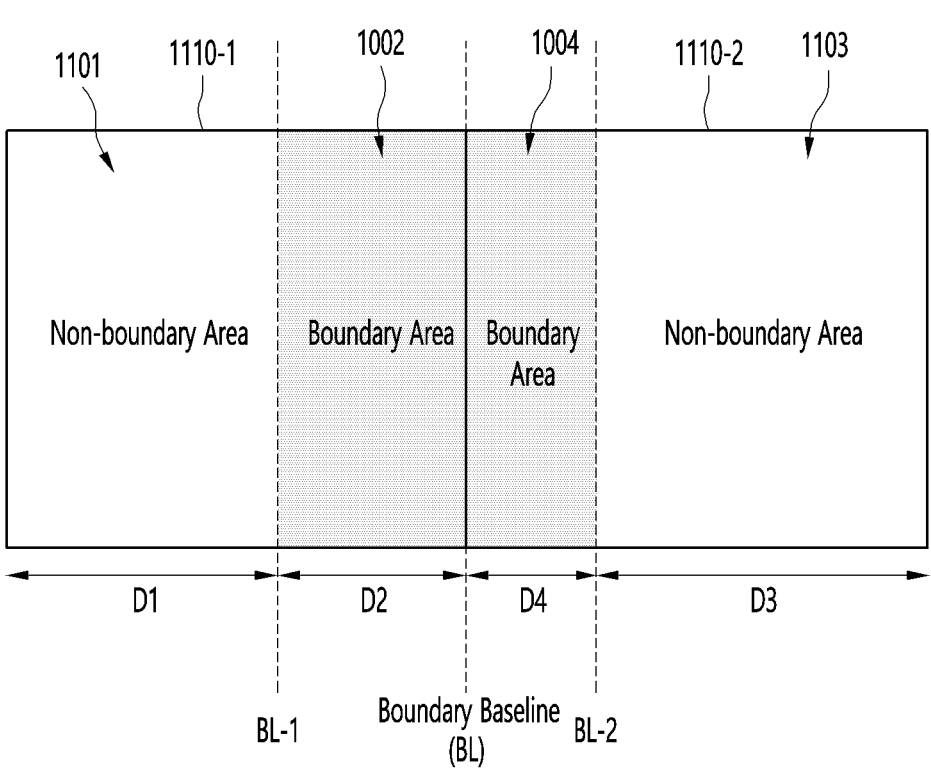
FIG. 13 is a first example diagram illustrating a method for dividing a boundary area and a non-boundary area of a panel by a touch microcontroller unit according to an embodiment.

FIG. 13 is a first example diagram illustrating a method for dividing a boundary area and a non-boundary area of a panel by a touch microcontroller unit according to an embodiment.

Referring to FIG. 13, the first area 1001 of the first panel 1010-1 can be defined as a non-boundary area, and the second area 1002 can be defined as a boundary area. The third area 1003 of the second panel 1010-2 can be defined as a non-boundary area, and the fourth area 1004 can be defined as a boundary area.

In the plurality of panels 1010-1 and 1010-2 of the touch sensing circuit 1000, each slave integrated circuit can simultaneously transmit own touch coordinates and raw touch data or delta touch data in areas overlapping with other panels, and the master integrated circuit can synthesize and calculate them and transfer the final coordinates to the host. This method can be defined as a mixed transmission method.

When a touch event occurs in the boundary area between the plurality of panels 1010-1 and 1010-2, the touch microcontroller unit of each panel 1010-1 and 1010-2 can calculate the touch coordinates of each panel 1010-1 and 1010-2 based on the touch data generated from each panel 1010-1 and 1010-2. Accordingly, one actual touch can be mistakenly recognized as two touches. As a way to solve this problem, there is a method of calculating touch coordinates by transmitting and collecting all raw touch data, but this method causes problems such as communication lines becoming busy and clock or memory usage increasing.

As a coordinate processing method for the plurality of panels 1010-1 and 1010-2, touch coordinates can be calculated for the non-boundary area, and a partial area of the panel containing raw touch data where a touch occurred can be determined in the boundary area, so that the touch coordinates of the non-boundary area and the raw touch data of the boundary area can be transmitted together. Accordingly, the accuracy of touch coordinate calculation can be improved while reducing data processing.

Figure 14:
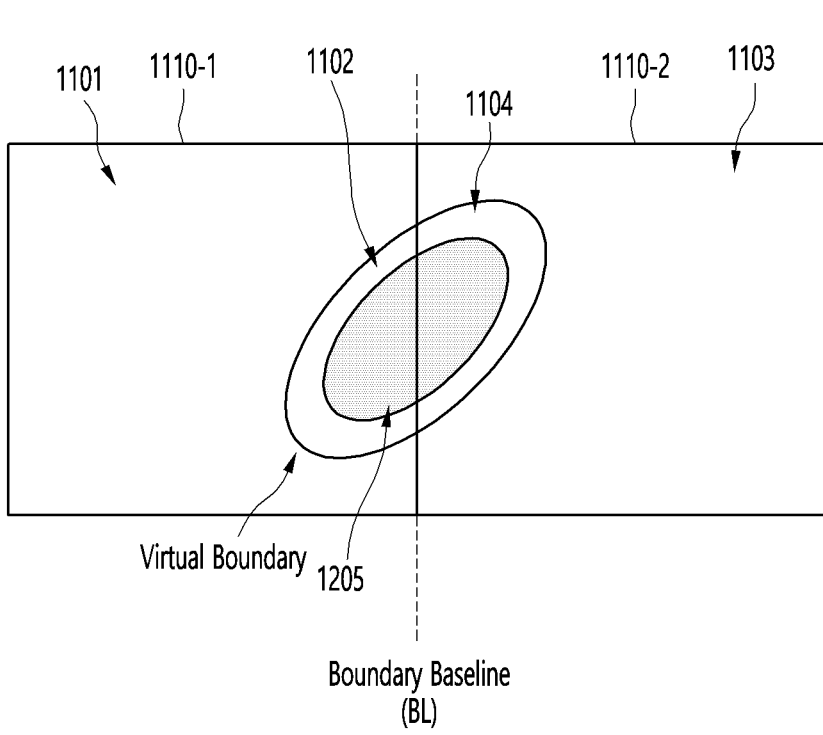
FIG. 14 is a second example diagram illustrating a method for dividing a boundary area and a non-boundary area of a panel by a touch microcontroller unit according to an embodiment.

FIG. 14 is a second example diagram illustrating a method for dividing a boundary area and a non-boundary area of a panel by a touch microcontroller unit according to an embodiment.

Referring to FIG. 14, the touch sensing circuit 1100 can divide a boundary area and a non-boundary area by forming a in the panels 1110-1 and 1110-2.

The first area 1101 and the second area 1102 of the first panel 1110-1 can be divided by a virtual boundary, and the third area 1103 of the second panel 1110-2 and the fourth area 1104 can be divided by a virtual boundary.

The touch microcontroller unit of the touch sensing circuit 1100 can set a virtual boundary at a certain distance from the touch boundary based on the touch distribution 1205 in which it is determined that an actual touch event occurred. In this instance, unlike the area division based on the distance from the boundary baseline BL, raw touch data is transmitted only near the area where the actual touch event occurred, so that the above-mentioned problem can be solved more effectively.

FIG. 15 is a flowchart of a touch sensing method according to an embodiment.

Referring to FIG. 15, the touch sensing method 1200 can comprise a step of dividing an area of the first panel (S1210), a step of transmitting touch coordinates and touch data of the first panel (S1220), a step of dividing an area of the second panel (S1230), a step of transmitting touch coordinates and touch data of the second panel (S1240), a step of calculating final touch coordinates of all panels (S1250), etc.

The step of dividing an area of the first panel (S1210) can comprise a step in which the first touch microcontroller unit can acquire touch data of the first panel and divide the touch data into a first area and a second area. Here, the first area and the second area can be defined as the entire or partial area of the first panel.

The step of transmitting touch coordinates and touch data of the first panel (S1220) can comprise a step in which the first touch microcontroller unit can calculate touch coordinates in the first area but does not calculate touch coordinates in the second area.

In addition, the step of transmitting touch coordinates and touch data of the first panel (S1220) can comprise a step in which the first touch microcontroller unit can transmit the touch coordinates of the first area and the touch data of the second area to the second touch microcontroller unit.

The step of dividing an area of the second panel (S1230) can comprise a step in which the second touch microcontroller unit can acquire touch data of the second panel and divides the touch data into a third area and a fourth area.

The step of transmitting touch coordinates and touch data of the second panel (S1240) can comprise the step of the second touch microcontroller unit can calculate the touch coordinates in the third area and but does not calculate touch coordinates in the fourth area.

The step of transmitting touch coordinates and touch data of the second panel (S1240) can comprise a step in which the second touch microcontroller unit can transmit the touch coordinates of the fourth area and the touch data of the third area to the third touch microcontroller unit.

The step of calculating final touch coordinates of all panels (S1250) can comprise a step in which the third touch microcontroller unit can collect the touch coordinates and touch data of the first panel and the second panel to calculate the final touch coordinates of the entire panel.

The third touch microcontroller unit can receive touch coordinates of the first area of the first panel, touch data of the second area of the first panel, touch coordinates of the third area of the second panel, and touch data of the fourth area of the second panel.

The third touch microcontroller unit can integrate the touch data of the second area of the first panel and the touch data of the fourth area of the second panel to calculate the touch coordinates of the boundary area of the first panel and the second panel.

There may be a communication connection in which the third touch microcontroller unit can be comprise master integrated circuit, and the first touch microcontroller unit and the second touch microcontroller unit can comprise slave integrated circuits.

The third touch microcontroller unit can simultaneously or sequentially receive the touch coordinates and touch data of each of the first touch microcontroller unit and the second touch microcontroller unit.

The first area and the second area of the first panel can be divided by separating a first distance from the boundary baseline formed by meeting the first panel and the second panel, and the third area and the fourth area of the second panel can be divided by separating a second distance from the boundary baseline formed by meeting the first panel and the second panel. The first distance can be determined based on the distribution of touch data in the second area, and the second distance can be determined based on the distribution of touch data in the fourth area.

What is claimed is:

1. A touch microcontroller unit, comprising:
a first touch microcontroller unit comprising:
    a touch data acquisition circuit configured to acquire touch data of a first area and touch data of a second area of a first panel;
    an area division boundary calculation circuit configured to calculate a boundary in the first panel to divide the first area and the second area;
    a touch coordinate calculation circuit configured to calculate touch coordinates of the first area based on the touch data of the first area and not to calculate touch coordinates of the second area; and
    a touch data transmission circuit configured to transmit the touch coordinates of the first area and the touch data of the second area to another touch microcontroller unit,
    wherein the another touch microcontroller unit is configured to collect the touch data of the second area of the first panel and to calculate touch coordinates of the second area based on the touch data of the second area.

2. The touch microcontroller unit of claim 1, further comprising:
a second touch microcontroller unit comprising:
    a touch data acquisition circuit configured to acquire touch data of a third area and touch data of a fourth area of a second panel,
    an area division boundary calculation circuit configured to calculate a boundary in the second panel to divide the third area and the fourth area, and
    a touch coordinate calculation circuit configured to calculate touch coordinates of the third area based on the touch data of the third area.

3. The touch microcontroller unit of claim 2, further comprising:

a third touch microcontroller unit, wherein the third microcontroller unit is the another touch microcontroller unit, and wherein the third microcontroller unit is configured:
    to collect the touch data of the second area of the first panel and the touch data of the fourth area of the second panel,
    to align the touch data of the second area and the touch data of the fourth area based on a boundary baseline of the first panel and the second panel, and
    to calculate one touch coordinate near the boundary baseline.

4. The touch microcontroller unit of claim 3, wherein the third touch microcontroller unit is configured to acquire touch data of a third panel and calculate touch coordinates of the third panel.

5. A touch microcontroller unit, comprising:
a touch data acquisition circuit configured to receive touch coordinates of a first area of a first panel and touch data of a second area of the first panel from another touch microcontroller unit, and acquire touch data of a third area and touch data of a fourth area of a second panel, wherein the touch coordinates of the first area were calculated by the another touch microcontroller unit;
an area division boundary calculation circuit configured to calculate a boundary in the second panel to divide the third area and the fourth area; and
a touch coordinate calculation circuit configured to calculate touch coordinates of the third area based on the touch data of the third area of the second panel,
wherein the touch coordinate calculation circuit is configured to calculate touch coordinates of a boundary area between the first panel and the second panel by integrating the touch data of the second area of the first panel and the touch data of the fourth area of the second panel.

6. The touch microcontroller unit of claim 5, comprising:
a touch data transmission circuit configured to transmit the touch coordinates of the first area of the first panel, the touch coordinates of the third area of the second panel, and the touch coordinates of the boundary area between the first panel and the second panel to another touch microcontroller unit.

7. The touch microcontroller unit of claim 5, wherein the data transmission circuit is configured to transmit the touch coordinates of the first panel and the touch coordinates of the second panel to a master touch microcontroller unit that determines the touch coordinates of the first panel and the second panel.

8. The touch microcontroller unit of claim 5, wherein the area division boundary calculation circuit is configured to divide the third area and the fourth area of the second panel by separating a certain distance from a boundary baseline formed by meeting the first panel and the second panel.

9. A touch sensing circuit, comprising:
a first touch microcontroller unit configured to acquire touch data of a first panel and calculate touch coordinates of the first panel; and
a second touch microcontroller unit configured to acquire touch data of a second panel and calculate touch coordinates of the second panel, wherein
the first touch microcontroller unit is configured to calculate a boundary in the first panel to divide a first area and a second area, calculate touch data of the first area of the first panel to acquire touch coordinates, and not to calculate touch coordinates for the touch data of the second area of the first panel, and the first touch microcontroller unit is configured to transmit the touch coordinates of the first area and the touch data of the second area to the second touch microcontroller unit, wherein a third touch microcontroller unit is configured to calculate touch coordinates of the second area.

10. The touch sensing circuit of claim 9, wherein the second touch microcontroller unit is configured:

to calculate a boundary in the second panel to divide a third area and a fourth area, to calculate touch data of the third area of the second panel to acquire touch coordinates, and not to calculate touch coordinates for touch data in the fourth area of the second panel.

11. The touch sensing circuit of claim 9, comprising:

the third touch microcontroller unit configured:

to receive the touch data and the touch coordinates of the first panel from the first touch microcontroller unit, and to receive the touch data and the touch coordinates of the second panel from the second touch microcontroller unit.

12. The touch sensing circuit of claim 11, wherein the third touch microcontroller unit is configured to calculate touch coordinates by integrating the touch data of the second area of the first panel and the touch data of the fourth area of the second panel.

13. The touch sensing circuit of claim 11, wherein there is a communication connection in which the third touch microcontroller unit comprises a master integrated circuit and the first touch microcontroller unit and the second touch microcontroller unit comprise slave integrated circuits, and the third touch microcontroller unit is configured to calculate touch coordinates of a boundary area between the first panel and the second panel.

14. The touch sensing circuit of claim 11, wherein the first touch microcontroller unit is configured to calculate touch coordinates of the first panel to transmit the touch coordinates to the second touch microcontroller unit, and the second touch microcontroller unit is configured to calculate touch coordinates of the second panel to transmit the touch coordinates of the first panel and the touch coordinates of the second panel to the third touch microcontroller unit.

15. The touch sensing circuit of claim 9, wherein the first area and the second area of the first panel are configured to be divided by a boundary spaced a certain distance from a boundary baseline with the second panel.

16. The touch sensing circuit of claim 15, wherein the first touch microcontroller unit is configured to determine a boundary for dividing an area of the first panel based on distribution of touch data acquired from the first panel.

17. The touch sensing circuit of claim 9, wherein the first area and the second area of the first panel are configured to be divided based on a virtual boundary set at a certain distance from an area where a touch event occurred on the first panel.

18. The touch sensing circuit of claim 17, wherein the first touch microcontroller unit is configured:

to determine the virtual boundary for dividing an area of the first panel based on the distribution of touch data acquired from the first panel, and to update the virtual boundary every frame.

* * * * *